Patented Apr. 30, 1940

2,199,104

UNITED STATES PATENT OFFICE 2,199,104

MANUFACTURE OF SELENIUM SURFACES

William Arthur Johnson, Birkdale, Southport, and Henry Cobden Turner, Manchester, England, assignors to The General Electric Company Limited, London, England No Drawing. Application February 24, 1937, Serial No. 127,410. In Great Britain February 27, 1936

5 Claims. (Cl. 91—70.1)

This invention is concerned with the manufacture of metallic selenium surfaces for use for example, in light sensitive devices or contact rectifiers of the barrier layer type.

It has been previously proposed to prepare a selenium surface by direct distillation of selenium onto a base in vacuo. It has also been proposed to run molten selenium onto a base and to make the surface smooth by rolling with a polished roller while the selenium is cooling. As a further alternative it has been proposed to run molten selenium onto a base and then to cover the surface by a plate of material such as glass. The glass protective plate is later removed when the selenium is cold. The selenium layers so formed comprise vitreous selenium and are converted into the metallic modification of selenium by heat treatment at a temperature of approximately 200° C. Such methods, suffer however, from the disadvantage that the finished surface so obtained is flawed by fissures which are set up owing to the reduction in volume of selenium while changing from the viscous to the metallic form.

The object of the present invention is to provide a method of manufacture of metallic selenium surfaces which do not suffer from this disadvantage.

According to the present invention a method of manufacturing a selenium surface comprises the steps of coating with selenium, by melting and solidification, a chemically clean base surface of suitable material such as nickel plated iron, subliming selenium in air or oxygen onto a second chemically clean surface, bringing the two selenium surfaces in contact, applying pressure thereto and, whilst maintaining the pressure, slowly raising the temperature to a temperature sufficient to commence the change of the selenium to the metallic state, cooling to room temperature, releasing the pressure, and removing said second surface and thereafter raising the temperature of said selenium on said base surface to an extent sufficient to complete the change to the metallic state.

One method, in accordance with the invention, of manufacturing a selenium surface, will now be described by way of example.

A roughened nickel-plated iron plate is chemically cleaned and selenium is then melted onto the plate at a temperature of the order of 250° C. The molten selenium is then spread over the surface of the plate as smoothly as is convenient.

A second plate of freshly split mica (or chemically cleaned glass) is then coated, by sublimation in air, with selenium. Owing to the sublimation in air, the actual deposit will consist of selenium and selenium dioxide. The two plates when cooled to room temperature are then put together with their selenium coated faces in contact and are then placed in a jig. Preferably a number of pairs of plates are treated simultaneously, resilient material being placed between exterior faces of the plates, and pressure is then applied, of the order of 100 lbs./square inch.

The plates in the jig and still under pressure are placed in an oven and the temperature of the oven is slowly raised to a temperature between 90° C. and 140° C. over a period of from 10 to 40 hours. The actual temperature and time of heating depends on the nature of the selenium.

The vitreous selenium commences to change to the viscous state at a temperature of the order of 40° C. and runs into good contact with both surfaces, the excess of selenium being squeezed out at the edges of the plates.

As the temperature increases the change of the selenium to the metallic state commences, but the selenium, probably owing to surface tension at the interface with the mica, remains in contact therewith and shows no signs of fissuring.

The plates are then slowly cooled to room temperature, the pressure is released and they are then removed from the jig.

The metal discs are thereafter subjected to a heat treatment at a temperature of the order of 170° C. to complete the change of the selenium to the metallic state.

A selenium surface prepared in the manner described above may be used for the manufacture of a light sensitive device or may be used for the manufacture of a contact rectifier.

Having now particularly described and ascertained the nature of our said invention and in what manner the same is to be performed, we declare that what we claim is:

1. The method of manufacturing a selenium surface free from fissures, which comprises coating a base plate with melted selenium which is allowed to cool to room temperature, coating a second plate by sublimiation with a thin coating of selenium which is allowed to cool to room temperature, then placing the sublimation coating on and in contact with the base plate coating and applying pressure and heat thereto for a limited time, then cooling to room temperature and withdrawing the pressure, then removing the second plate.

2. The method of manufacturing a selenium surface free from fissures, which comprises chemically cleaning a base plate and coating it with a layer of melted selenium which is allowed to cool to room temperature, chemically cleaning a second plate and coating it by sublimation with a thin layer of selenium which is allowed to cool to room temperature, then placing the sublimation coating on and in contact with the base plate coating and applying pressure and heat thereto for a limited period, then cooling to room temperature and withdrawing the pressure, then removing the second plate.

3. The method of manufacturing a selenium surface free from fissures as in claim 2 wherein the pressure applied to the selenium coatings in contact while being heated is of the order of 100 pounds per square inch.

4. The method of manufacturing a selenium surface free from fissures as in claim 2 wherein the heat applied to the selenium coatings in contact while under pressure is applied at a slowly rising temperature on the order of 90° C. to 140° C. over a period of 10 to 40 hours.

5. The method of manufacturing a selenium surface free from fissures as in claim 2 wherein after removal of the second plate the selenium surface is annealed at a temperature on the order of 170° C. for a sufficient period to complete conversion into the metallic state.

WILLIAM ARTHUR JOHNSON.
H. COBDEN TURNER.